(12) United States Patent
Sainanee et al.

(10) Patent No.: US 11,086,827 B1
(45) Date of Patent: Aug. 10, 2021

(54) DATASET SCHEMA AND METADATA MANAGEMENT SERVICE

(71) Applicant: Amazon Technologies, Inc., Seattle, WA (US)

(72) Inventors: Archak Sainanee, Seattle, WA (US); Ratnakar Choudhary, Livermore, CA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 16/134,788

(22) Filed: Sep. 18, 2018

(51) Int. Cl.
*G06F 16/21* (2019.01)
*G06F 11/34* (2006.01)
*G06F 16/907* (2019.01)
*G06F 16/22* (2019.01)

(52) U.S. Cl.
CPC ........ *G06F 16/211* (2019.01); *G06F 11/3409* (2013.01); *G06F 16/2228* (2019.01); *G06F 16/907* (2019.01)

(58) Field of Classification Search
CPC .. G06F 16/211; G06F 16/907; G06F 16/2228; G06F 11/3409
See application file for complete search history.

(56) References Cited

U.S. PATENT DOCUMENTS

2006/0235714 A1* 10/2006 Adinolfi ................. G06Q 40/06
705/1.1
2015/0269157 A1* 9/2015 Biem ..................... G06N 20/00
707/603

* cited by examiner

*Primary Examiner* — Truong V Vo
(74) *Attorney, Agent, or Firm* — Nicholson De Vos Webster & Elliott, LLP

(57) ABSTRACT

Techniques for dataset schema and metadata management are described. A data model management service provides a logically centralized repository that allows discovery of datasets via exploration of dataset metadata. The data model management service can ensure the validity of the datasets and the associated metadata by enforcing dataset validation rules and/or requiring dataset metadata to be provided and limiting visibility into non-compliant datasets.

20 Claims, 10 Drawing Sheets

DATASET SCHEMA AND METADATA MANAGEMENT SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

Further, the amount of data generated by users and systems has exploded, leading to a significant problem regarding how to find, understand, and use this data. This problem is especially challenging when non-technical users wish to find and use data, as well as when the data being generated (and provided to other users) changes over time, potentially unbeknownst to users relying upon that data.

BRIEF DESCRIPTION OF DRAWINGS

Various embodiments in accordance with the present disclosure will be described with reference to the drawings, in which.

DETAILED DESCRIPTION

Figure 1:
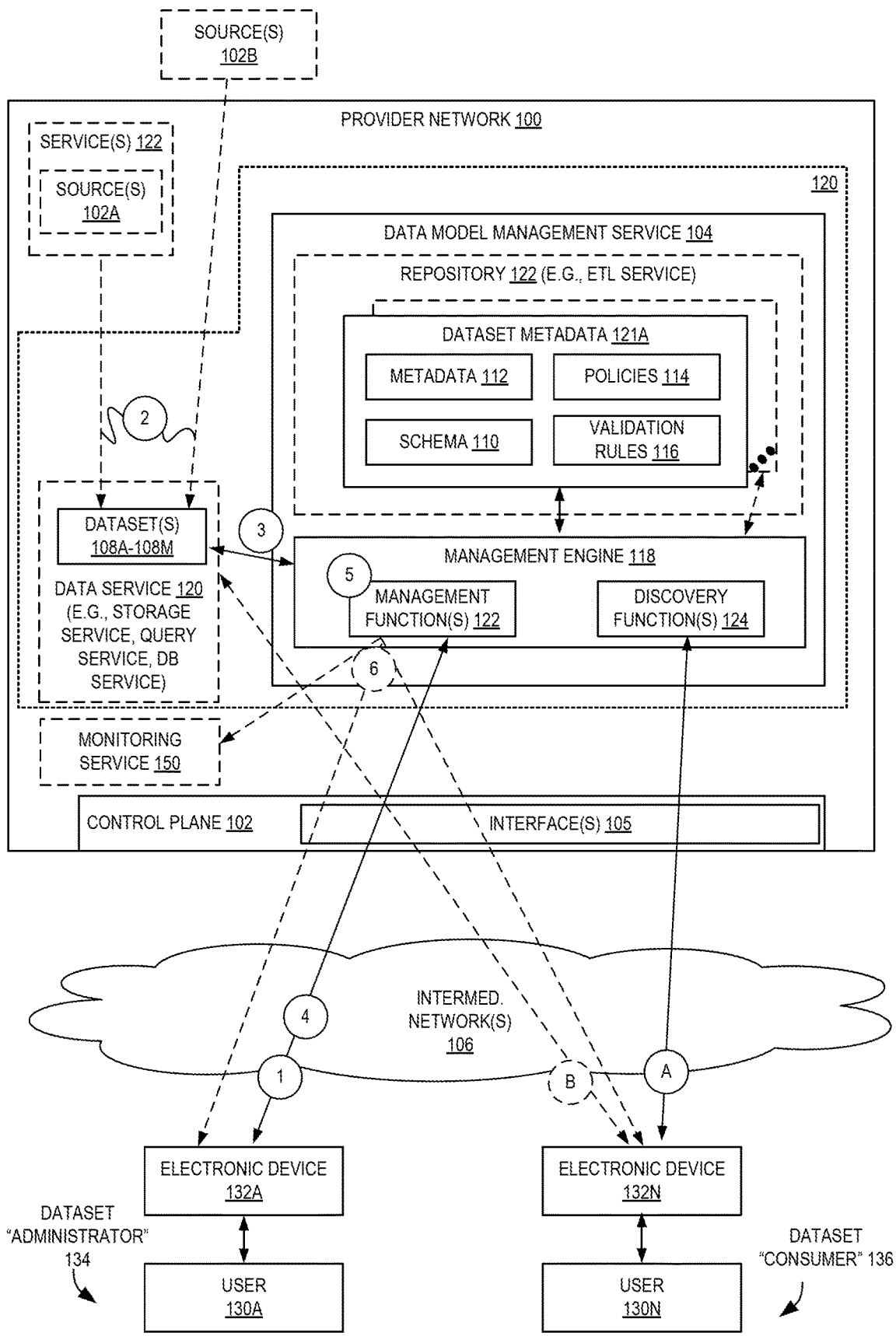
FIG. 1 is a diagram illustrating an environment including a data model management service for dataset schema and metadata management according to some embodiments.

In the realm of modern computing, huge amounts of data are generated, stored, and analyzed or otherwise used. Numerous problems arise from trying to manage and utilize these types of datasets, including understanding or recalling what the collected data means, controlling who may access the datasets and in what ways, accommodating and/or detecting scenarios where the data may be inconsistent or change in type over time (potentially despite existing reliance upon the previous type of data), etc.

However, these problems are typically compounded when multiple users are involved, such as when one user acts as a source of data and another user uses the data. For example, if multiple unstructured and/or structured datasets are aggregated and made accessible via a common dataset repository system, users of the system would be presented with multiple datasets without an understanding of what the datasets represent, what the schemas for the datasets look like, whether a particular dataset can be used for their desired use case, whether the datasets are recent and up to date, whether the datasets are reliable and internally consistent. Additionally, a user providing datasets to such a repository system may want to ensure the quality of their datasets, assist other users in understanding what their datasets relate to, etc. Technological systems providing such functionalities do not exist.

Accordingly, various embodiments of methods, apparatus, systems, and non-transitory computer-readable storage media for dataset schema and metadata management are described. In some embodiments, a data model management service provides a highly-available, centralized schema repository that enables user applications to offload schema management responsibilities to the service. The data model management service can enable users to add and/or manage dataset related items, such as relevant metadata for datasets, policies for access management and retention, annotations, and/or quality checks for the datasets they own.

In some embodiments, for users who wish to utilize existing datasets (e.g., stored within a distributed file system), the data model management service may provide an interface to enable the discovery of the data model.

The data model management service 104 thus implements a "metadata first" approach in that, when a user attempts to "publish" a dataset via the data model management service 104, the user provides metadata describing the dataset, that is, indicating what the dataset means. As system organically changes, the data model management service 104 can identify any changes to the dataset or "holes" in the dataset, and can optionally encourage—or even "force"—the publishing user to fix any identified issues with the dataset(s) that do not adhere to the user-provided schema or "package" metadata.

In some embodiments, the data model management service 104 implements schema-on-read operations in which the data model management service 104 can "read" a dataset, identify the schema by analyzing the dataset to infer and/or detect the schema, and solicit additional metadata from the providing user to thus evolve the dataset into a richer asset that can be searched, monitored, etc.

The data model management service 104, in some embodiments, provides a compute component in the form of management function(s) 122 that enforces schema validations and quality checks, and can signal the violation of such validations to dataset owners and/or consumers. This component may also perform auto-detection of schemas for new and modified datasets and may persist the changes to the schema repository 122.

Thus, in various embodiments the data model management service enforces user-specified rules within those users' datasets—e.g., values of a particular column should only fluctuate between 0 and 100, etc., which can increase the fidelity of datasets flowing through the repository. Moreover, other aspects of the datasets can be managed related to the overall quality of the data in terms of schema management. For example, the data model management service may detect a scenario in which values of a field of a dataset were originally an integer, but somehow are changed to be a string.

In some embodiments, data stores (or, storage services) that store datasets and provide access to the datasets (e.g., via queries) can provide dataset consumption data to the data model management service 104 in the form of the queries accessing the datasets or portions of the datasets being accessed. The data model management service 104 can use this consumption data to provide insights to users exploring the datasets as to what datasets, portions of datasets, etc., are being queried or have been queried in the past, revealing what datasets (or portions) are of interest to others.

Embodiments can be particularly useful in large-scale cloud computing type environments systems with lots of data, and similarly useful in other environments having large catalogs of structured or semi-structured data, to allow for large amounts of data to be navigated, comprehended, and utilized with quality assurances.

FIG. 1 is a diagram illustrating an environment including a data model management service 104 for dataset schema and metadata management according to some embodiments. In FIG. 1, the data model management service 104 is shown as part of a provider network 100, though in other embodiments the data model management service 104 may be implemented outside of a provider network 100, such as within a private or "on premise" network environment of an organization. The data model management service 104 may operate with a distinct data service 120 that stores datasets 108A-108M, though in some embodiments the data model management service 104 acts as a part of a data service 120.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers, other data processing resources, etc. These and other computing resources may be provided as services, such as a hardware virtualization service that executes compute instances, a storage service that stores data objects, etc. Users 130A-130N (or "customers") of provider networks 100 may utilize one or more user accounts that are associated with a customer account, though these terms may be used somewhat interchangeably depending upon the context of use. Users 130A-130N may interact with a provider network 100 across one or more intermediate networks 106 (e.g., the internet) via one or more interface(s) 105, such as through use of application programming interface (API) calls to an API endpoint of the provider network 100, via a console implemented as a website or application, etc. The interface(s) 105 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network 100 to perform a variety of computing tasks, or may indirectly utilize a compute instance by submitting code to be executed by the provider network 100, which in turn utilizes a compute instance to execute the code (typically without the user having any control of or knowledge of the underlying compute instance(s) involved).

The data model management service 104 is implemented using one or more multiple computing devices located at one or multiple locations and may be implemented as a web service. Accordingly, users 130A-130N may interact with the data model management service 104 via sending web service API calls via HTTP request messages and receiving web service API responses sent using HTTP response messages, though other types of invocations and transport mechanisms can be used as known to those of ordinary skill in the art.

The data model management service 104 acts as a logically centralized point in which users 130A-130N that can utilize an extendible data model to enable users to self-service detection of patterns, relationships and events in data that may not be obvious at the outset. The data model management service 104 can also enable users to own and manage their datasets, from ingestion to consumption, as these users are in the best position to understand the nuances behind the data. Accordingly, the data model management service 104 acts as a custodian of the user's datasets and provides functionalities to simplify user tasks.

Thus, the data model management service 104 can act as a centralized repository to allow users to discover datasets housed within one or more data services 120, along with their characteristics (e.g., conceptual characteristics, physical data model, etc.). Moreover, in some embodiments, users can persist and share metadata describing their datasets via the data model management service 104, and in some embodiments the data model management service 104 can provide guidance on the functional aspects of these datasets such as real-time persistence, retention, etc. In some embodiments, the data model management service 104 can also provide simple access management of user datasets and avail audit information to understand consumer usage patterns of this data. The data model management service 104 can also allow users to store and extend data quality checks on the ingress data, such as data type validations, positive integer checks, percentage checks, or use-case specific validations such as enforcing valid bounds, comparing summaries with an (possibly external/remote) authoritative dataset, etc.

As shown in FIG. 1, the data model management service 104 includes a management engine 118 comprising one or more management function(s) 122 and one or more discovery function(s) 124. The management engine 118 may be implemented using software executed by one or multiple computing devices in a localized or distributed manner. For example, when the data model management service 104 is implemented within a distributed provider network 100, the management engine 118 may be implemented in a distributed fashion using computing devices in potentially many different geographic locations.

The management function(s) 122 may operate to perform dataset "management" operations, which may be performed responsive to requests from users 130A acting as a administrator 134 of a dataset. Dataset administrators may utilize one or more interfaces 105 to access the management functions 122 to manage the various aspects of the datasets that they manage, such as creating/updating schemas, adding rules for the schema check for datasets, updating metadata, defining access control authorization, etc.

For example, at circle (1), a user 130A managing one or more datasets 108A-108M may use an electronic device 132A to send a request to ingest a dataset 108A (also referred to herein as "registering a namespace" for a dataset). The datasets 108A-108M may be stored within a data service 120 such as a storage service, a database service, a query service, etc., as described herein. Thus, the datasets 108A-108M may be databases, database tables or collections of records, files, etc.

The datasets 108A-108M may be generated by one or more sources 102A-102B located within (source(s) 102A) or outside (source(s) 102B) of the provider network 100 as shown at circle (2). For example, a source 102A may be (or be from within) another service 122 of the provider network 100—e.g., a set of one or more compute instances or physical computing host devices of a hardware virtualization service, machine learning service, storage service, etc. The datasets 108A-108M may be and/or include a variety of types of data (e.g., integers, strings/text, booleans, real/floats, documents, etc.), and may represent nearly any type of information (e.g., metrics representing computing device or service performance data, customer/sales information, etc.).

The request to ingest the dataset 108A may include an identifier of the dataset (e.g., a unique identifier in the context of the data service 120 such as a "namespace", a Uniform Resource Locator (URL) associated with the dataset 108A, etc.). The request may or may not include a schema of the dataset. Thus, in some embodiments, a user may thereafter submit Optionally, the request may also include the actual dataset itself. When a schema is included with the request, the schema may optionally be verified (by comparing the schema against the actual data records within the dataset 108A, at circle (3)) and stored as schema 110 within dataset metadata 121A associated with the dataset 108A. In cases where the schema is not included with the request (or a subsequent request), the management function(s) 122 may request a schema from the data service 120 (when the data service 120 exists and has that functionality), or may auto-detect the schema by analyzing at least some data records—if not all—of the dataset 108A itself to identify the schema (e.g., be detecting attributes, and the types of those attributes by detecting common types of values of each attribute).

In some embodiments, when a schema is auto-detected, the management engine 118 may have the administrator 134 confirm that the schema 110 is proper, e.g., by sending a message to the electronic device 132A with the detected schema 110 (e.g., to be presented to the user 130A via a graphical user interface (GUI)), and receiving a message sent by the electronic device 132A responsive to the user 130A either indicating that the schema 110 is valid, or including a modified schema as specified by the user 130A. Thus, this message may include a "validity identifier" indicating whether the schema 110 is valid, and/or may include an updated schema or schema portions allowing the data model management service 104 to have and store a correct schema 110.

The user 130A may also provide, via a previously-discussed message (e.g., within a message confirming/denying a detected schema) or other message at circle (4), metadata 112 for the dataset 108A or portions of the dataset 108A, policies 114, and/or validation rules 116. The metadata 112, policies 114, and validation rules 116 may be provided using API calls specific to each, or in one or more API calls that can provide multiple ones of these elements.

For example, after an initial ingestion (e.g., by the user providing a schema, or the management function 122 auto-detecting the schema), the management engine 118 may send a message to the administrator 134 to provide metadata 112 associated with the corresponding dataset 108A. For example, the metadata 112 may include a textual description of what the dataset is or includes or represents, and thus may be associated with the overall dataset 108A. The metadata 112 may additionally or alternatively include textual descriptions of particular attributes (or, "columns") present in the dataset—e.g., a "total_MB" attribute in a dataset may have associated textual metadata describing that the values of the attribute represent "a total number of megabytes consumed at that point in time". The metadata 112 may also include other types of data, such as electronic documents (e.g., Microsoft® Word® documents or Portable Document Format (PDF) documents), etc. As another example, the metadata may include license information that indicates what the dataset is licensed under (e.g., which license and/or restrictions), and could be set by the source or the administrator. Such license data can also be used to determine policies around the access to and/or use of the dataset.

In some embodiments, the administrator user 130A may also specify, at circle (4), one or more validation rules 116 via a message to the management engine 118. The validation rules 116 can be defined to specify and enforce quality checks on the datasets. For example, a validation rule 116 can be specified to indicate that values of an attribute (column) of a dataset must be less than a specified or derivable value, be included in a set of allowable values, be greater than a specified or derivable value, be within a particular range or ranges, not include NULL values, be of a particular type (e.g., integer), etc. A validation rule 116 may also be based on multiple values of an attribute, e.g., a rule could specify that a sum or average of all values (from all time, within the past hour, etc.) must be less than a threshold value. As another possibility, validation rules 116 may be auto-detected by the data model management service 104, e.g., by analyzing the dataset(s) 108 to determine that certain values must be of a particular type, etc. These validation rules 116 can be applied, by the management function 122, as new data/records are ingested into the datasets 108A-108M or on a periodic or scheduled basis.

The success or failure of ones of the validation rules 116 may be used by the management function 122 at circle (5) to generate a validation score for the dataset 108A indicating how "valid" the dataset is or was. The validation score can be implemented in a variety of ways, such as by calculating a number/percentage of the validation rules that were determined to be met by the dataset. A "health" score may further be generated based on the validation score and optionally one or more other factors that can indicate an overall "health" of the dataset. The health score, for example, can be based on an amount of time (a recent amount of time, an overall amount of time, etc.) that the dataset remained in compliance with the validation rule(s), based on how frequently the dataset is updated, based on a determination of whether the dataset (or, new records added to the dataset) adheres to the schema 110, based on the health score or issues of another dataset (upon which the dataset depends) so that an "unhealthy" dataset can affect the healthiness of a dependent dataset, etc. In some embodiments, the health score can be based on multiple of these or other factors, where some of the factors may be weighted more heavily in determining the overall validation score.

The administrator user 130A may also specify, at circle (4), one or more policies 114 for the dataset 108A. A policy may indicate, for example, which users, types of users, roles, organizations, etc., may access, view, or otherwise utilize the corresponding dataset 108A or dataset metadata 121A, and/or specify other constraints on how this data can be accessed (e.g., according to time of day, day of week, location of the requesting user 130N, etc.).

The one or more policies 114 may also specify actions to be performed by the management engine 118 at circle (5) upon a validation rule 116 failing, a record of a dataset 108A not conforming to the schema 110, etc. For example, a policy 114 may be configured to, upon the failure of a record to adhere to the schema 110, reject the record from being added to the dataset 108A, place the record (or request to add the record) in an error queue, send a message to some destination (e.g., another application) or user (e.g., sending an email or Short Message Service (SMS) message to the user 130A), do nothing, etc. As another example, upon the management function(s) 122 detecting that newly-arrived records of a dataset do not adhere to the existing schema, at optional circle (6) the management function(s) 122 can send messages to signal the detection of these changes to one or more of a monitoring service 150 (e.g., that stores logging information and/or performs actions based on rules configured for the logs), to an account (or device 132A) of the associated administrator user 130A, to an account (or device 132N) of any consumer 136 users 130N that utilize the involved datasets 108A, etc.

Figure 2:
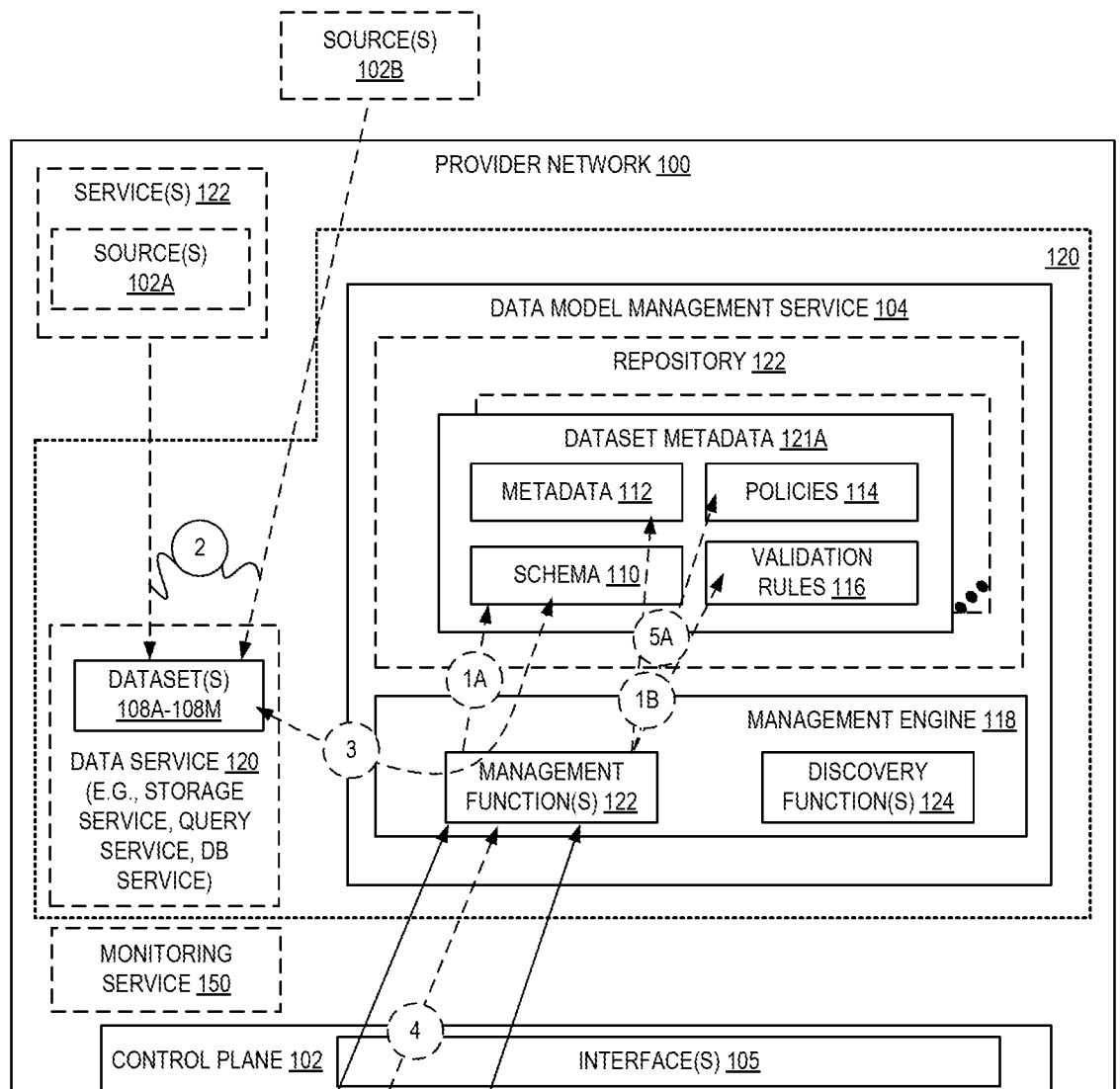
FIG. 2 is a diagram illustrating exemplary operations for dataset schema and metadata management by a dataset administrator user in the environment of FIG. 1 according to some embodiments.
Figure 2:
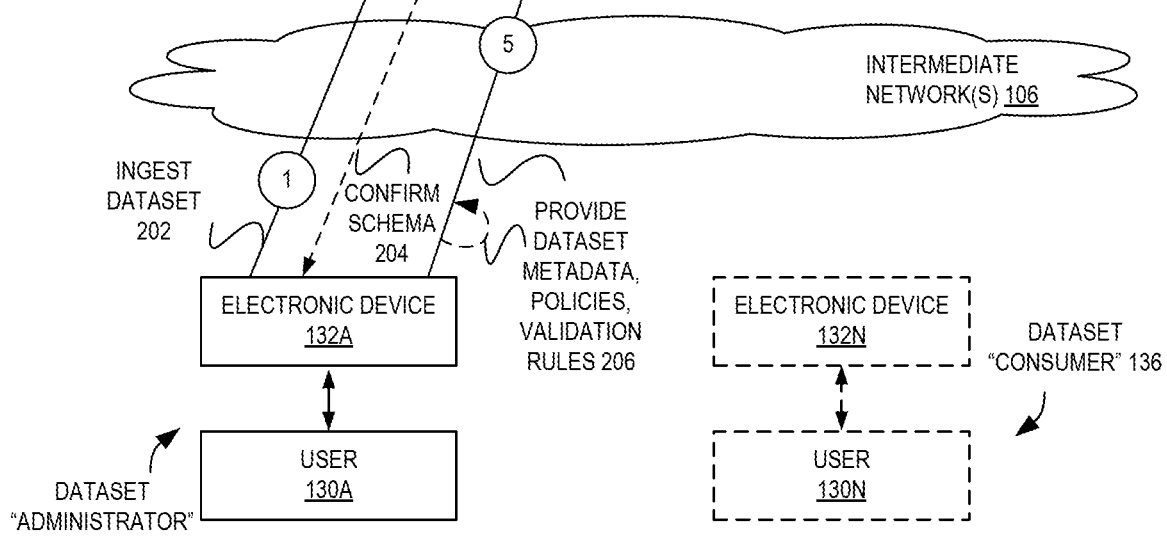

For further detail, we turn to FIG. 2, which is a diagram illustrating exemplary operations for dataset schema and metadata management by a dataset administrator user 130A in the environment of FIG. 1 according to some embodiments. As illustrated at (1), a administrator user 130A may utilize an application (e.g., a web application provided via a web browser, a special-purpose application, a script, a command line interface (CLI), etc.) to send a request 202 to ingest a dataset into the data model management service 104. The request 202 may identify an existing or not-yet-existing dataset (e.g., a namespace). In some embodiments, the request 202 may specify a schema for the dataset, which can be stored at optional circle (1A). As another example, in some embodiments the request(s) 202 may provide one or more policies 114 and/or one or more validation rules 116, which can be stored as shown at circle (1B).

However, in some scenarios, the request 202 may not specify a schema for the dataset. Thus, the user may provider a schema in a later request (e.g., request 206), or the data model management service 104 may analyze one or more records of a dataset (provided earlier or contemporaneously at circle (2)) at circle (3) to generate a proposed schema 110, which at optional circle (4) can involve sending a message 204 carrying the proposed schema 110 to the user, and receiving a message back indicating a confirmation of whether the proposed schema 110 is correct, and/or indicating/specifying a correct schema 110. (In the latter case, the management function(s) 122 may then verify that the user-specified schema is correct by analyzing the records from the dataset and may perform additional rounds of validation with the user while discrepancies continue to be found.) One confirmed, the management function(s) 122 can store the schema 110 with the set of dataset metadata 121A for the dataset.

In some embodiments, the management function(s) 122 may also prompt (or solicit) the administrator user 130A to provide additional metadata for the dataset 108A in the form of metadata 112, policies 114, and/or validation rules 116. This metadata may be provided by the user 130A (e.g., using an application executed by electronic device 132A), where the electronic device 132A sends one or more messages 206 at circle (5) carrying (or identifying) the dataset metadata 112 (e.g., textual descriptions of the dataset, individual attributes of the dataset, supporting documentation associated with a service/source of the dataset, etc.), policies 114, and/or validation rules 116, which can be stored at circle (5A).

Turning back to FIG. 1, the discovery function(s) 124 may operate to perform dataset "discovery" operations, which may be performed responsive to requests from users 130N acting as a consumer 136 of datasets. Dataset consumer 136 users 130N may utilize one or more interfaces 105 to access the discovery function(s) 124 to obtain a comprehensive view of all the datasets available (i.e., have been ingested) by the data model management service 104 (optionally subject to policies 114), which can include obtaining information such as dataset metadata 112, dataset health, latency, retention details, etc., to allow the consumer to "self-serve" their dataset-related needs. Thus, consumer 136 users 130N can use the discovery function 124 for exploratory analysis of the datasets available, and to use the metadata 112 available to inform their decisions on selecting the appropriate datasets for their needs. As introduced earlier herein, to make dataset-related information visible to dataset consumers 136, administrators 134 of the datasets can implement the access management to enable their datasets to be discoverable in this shared repository 122 provided by the data model management service 104.

For example, as illustrated by circle (A), a consumer 136 user 130N may utilize an electronic device 132N to send a request via a "discovery" interface 105 to the discovery function 124. The request may carry a query (e.g., including one or more search terms) that can be executed to identify which datasets, if any, of the datasets ingested by the data model management service 104 match the query (and optionally are allowed to be access by the user subject to the policies 114, etc.) and thus may be of interest to the user 130N. Identifiers of the matching datasets, optionally along with metadata 112, the schema 110, the dataset's validation and/or health scores, etc., can be provided back to the user via another electronic message. Those matching datasets, as well as per-dataset specifics, can be presented to the user via one or more GUI elements (e.g., via a webpage, application screen, etc.) or via a textual display. The user 130N may also be able to view some recent records of the datasets 108A-108N to gain a deeper understanding of what exact data the datasets include, view metadata (such as associated documents, schemas, etc.) associated with the datasets, execute "sample" queries against ones of the datasets 108A-108N, etc., as described further herein.

Upon identifying one or more of the datasets of use to the user 130N, the user 130N may utilize another system to use the datasets as shown at optional circle (B)—e.g., by issuing direct queries (e.g., via data service 120) against the datasets, by configuring reports/queries (e.g., generated by data service 120) that may be published to a sink such as monitoring service 150, a storage service location or "bucket", an email, database, etc. Thus, users 130N can easily explore a wide range of datasets with—or without—needing to utilize any complex programming or data exploration techniques and can easily determine the system-guaranteed validity (in terms of adherence to a schema) of the datasets, etc., without needing to contact others or the administrators of the datasets. Moreover, organizations having many existing datasets can utilize the data model management service 104 to catalog these datasets, configure and enforce validation, understand the ongoing "health" of the datasets over time, etc.

Figure 3:
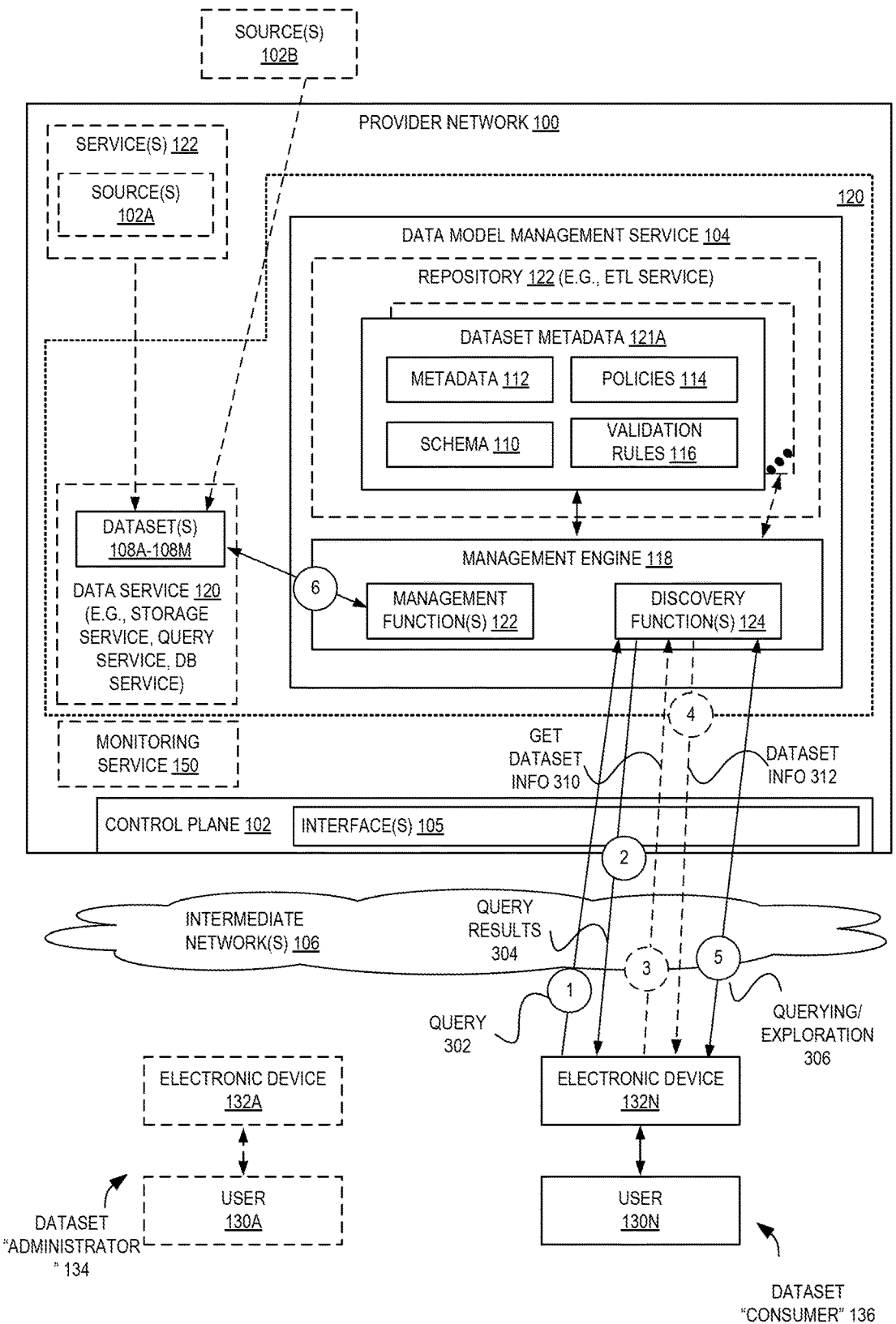
FIG. 3 is a diagram illustrating exemplary operations for dataset schema and metadata discovery by a user in the environment of FIG. 1 according to some embodiments.

For further detail, we turn to FIG. 3, which is a diagram illustrating exemplary operations for dataset schema and metadata discovery by a user in the environment of FIG. 1 according to some embodiments. In this illustration, a consumer 136 user 130N can interact with discovery function(s) 124 of the data model management service 104 to explore the repository of datasets ingested into the data model management service 104. For example, as shown at circle (1), a user 130N may interact with an application executed by the electronic device 132N to cause the electronic device 132N to send a query message 302 to the discovery function(s) 124. The query message 302 may carry an implicit query, thus asking the discovery function(s) 124 for information on all datasets in the system. The query message 302 may alternatively carry an explicit query, which may include one or more search terms or search clauses (including logic) to be used by the data model management service 104 to identify ones of the datasets matching the query by, e.g., searching against the dataset metadata 121A-121Z corresponding to those datasets 108A-108M ingested into the system. For example, for a query, the discovery function(s) 124 may search against an index of terms constructed from text from the schemas 110 and/or metadata 112, and optionally against the policies 114 and/or validation rules 116.

Figure 4:
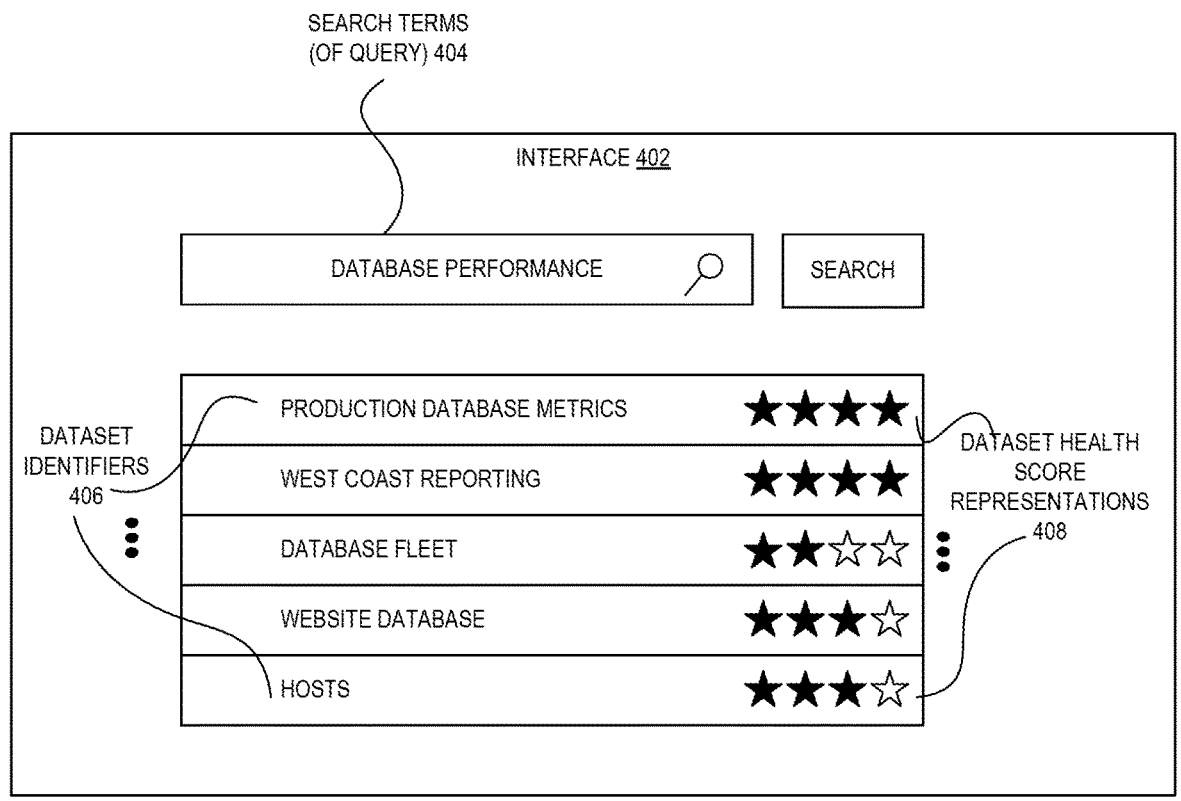
FIG. 4 is a diagram illustrating exemplary user interfaces for dataset exploration according to some embodiments.
Figure 4:
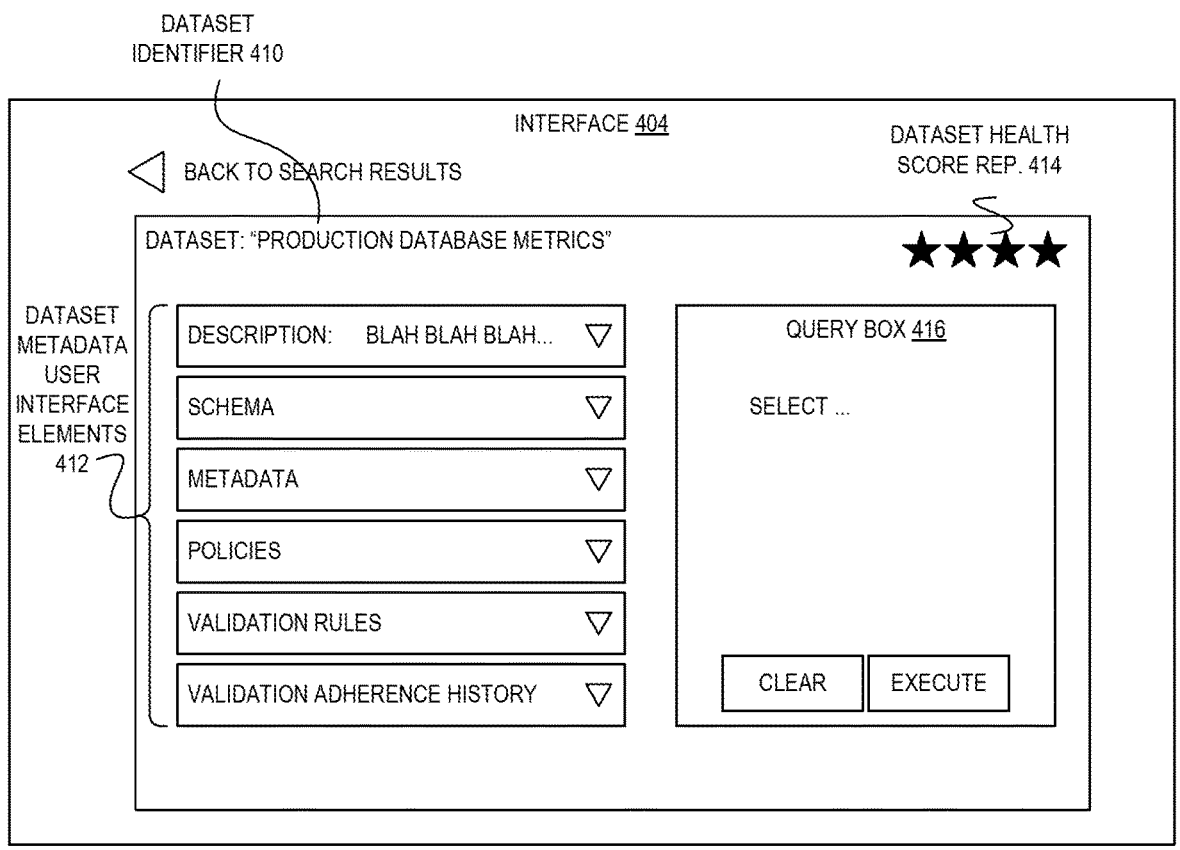

For example, we turn to FIG. 4, which is a diagram illustrating exemplary user interfaces 402, 404 for dataset exploration according to some embodiments. In the first interface 402, a user input element (e.g., a textbox) allows a user to provide search terms 404 for a query. Upon submitting the query (e.g., via an input button "search"), the user's device sends the query to the discovery function(s) 124, which is executed, and query results 304 are returned (at circle (2) from FIG. 3) to the device, which can be presented to the user. As shown, a set of dataset identifiers 406 for those datasets matching the query are displayed, and each dataset identifier is also shown with a representation 408 (here, a graphical icon, though other forms such as numbers, text, etc. may be used) of its corresponding health score, allowing the user to quickly see the "health" of the returned datasets.

Upon selecting one of the datasets to further explore that dataset, the electronic device 132N may send a request 310 to get dataset information that identifies a particular dataset (at circle (3) from FIG. 3), and the discovery function(s) 124 can obtain this information and send it back (at circle (4) from FIG. 3) in a dataset information message 312 to be presented to the user.

For example, interface 404 shows a dataset information detail view for a dataset having a dataset identifier 410 of "PRODUCTION DATABASE METRICS". In this interface 404, the corresponding dataset health score representation 414 is shown along with a set of dataset metadata user interface elements 412 that correspond to different pieces of information (including metadata) for the dataset—here, a description, schema, metadata, policies, validation rules, validation adherence history, etc. These pieces of information can be viewed by the user selecting ones of these elements. Of course, this exemplary user interface shows just one way to present this information, and other user interfaces may be constructed to convey this (or different) information pertaining to datasets in other embodiments.

In this example, the interface 404 also includes a query box 416 user interface element allowing the user to craft a "test" query against the dataset to explore the dataset itself. Thus, the user may craft a query (e.g., a Structured Query Language (SQL) or similar query) and submit the query to the discovery function(s) 124 (at circle (5) from FIG. 3), which can query the dataset using the query (or a modified query, such as one that limits the number of records to be return to a particular number) at circle (6) and return the results (or a portion of the results) to the electronic device 132N to be presented to the user 130N in a same or different user interface or user interface element.

Figure 5:
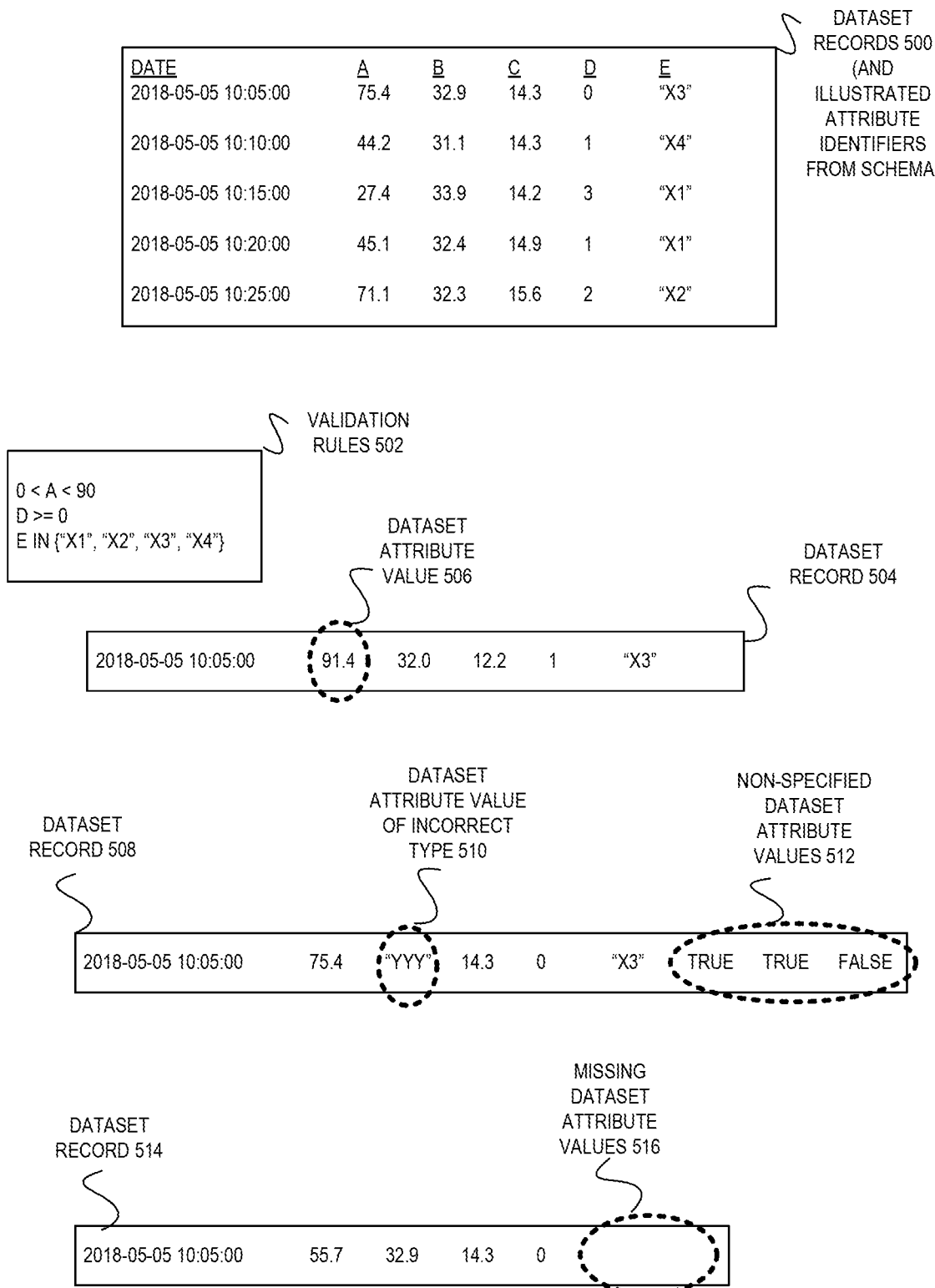
FIG. 5 is a diagram illustrating dataset records failing validation rules and dataset records not adhering to schemas according to some embodiments.

The data model management service 104 also can manage scenarios in which the datasets and/or schemas change, validation rules fail, et. For example, FIG. 5 is a diagram illustrating dataset records failing validation rules and dataset records not adhering to schemas according to some embodiments. At the top of FIG. 5, a set of dataset records is shown together with a representation of attributes from the dataset's schema. In this example, a first attribute is a datetime; a second, third, and fourth attribute are each a real/float, a fifth attribute ("D") is an integer, and a sixth attribute is a string (text).

A set of validation rules 502 are shown including three rules: (1) that values of the second attribute ("A") must be between 0 and 90; (2) that values of the fifth attribute ("D") must be greater than or equal to 0; and (3) that values of the sixth attribute ("E") must be within a defined set of values.

At some point, a dataset record 504 may be received that, while it does adhere to the schema, does not pass the validation rules. In this case, the second attribute ("A") has a value of 91.4, which breaks the validation rule of "0<A<90". A policy of the dataset, or other configuration, may cause the data model management service 104 to perform one or more actions in response, such as dropping the record 504, placing the record 504 in a separate storage location, sending an alert message (e.g., to a monitoring service 150, an account or device of a administrator 134 and/or consumer 136 of the dataset, etc.

Dataset records may also arrive that do not conform to the schema of the dataset. For example, dataset record 508 includes two types of deviations, in which a value 510 has an incorrect type (here, it is a string instead of a real/float), and three extra values 512 exist that are not defined in the schema. As another example, a dataset record 514 may arrive that includes missing attribute values 516 that were expected by the schema.

Such scenarios may occur for a variety of reasons. The emitting sources of the dataset may be updated/modified to emit new data, suffer from an unexpected bug or corner case, etc. In some embodiments, on a per-record or periodic/scheduled basis, the management function(s) 122 may detect dataset records that do not adhere to the schema, and can store the records as is, reject the records, place the records in a "holding" structure, alert other applications or users, etc. For example, the management function(s) 122 may update the schema to match the new records, send a schema approval message (seeking a response indicating a confirmation from the administrator that the new schema is proper), etc.

It may also be the case that both dataset records adhering to an old schema continue to arrive while dataset records adhering to a new schema arrive. This may result, for example, due to a slow rollout of a new version of an application to a fleet of applications/servers, in which the new version may have added a new value (e.g., a metric) to report. In some embodiments, the data model management service 104 can perform a versioning of the schema, storing both versions and assigning ones of the records with the corresponding schema. However, in some embodiments the data model management service 104 can switch to the new schema (e.g., leaving previous records without the new attribute with NULL or empty values), continue to use the old schema (e.g., deleting the new attribute values, or storing but not "showing" these values to consumers), etc.

In some embodiments, the data model management service 104, upon detecting a schema change, can seek confirmation from an administrator user as to whether the data model management service 104 should "enable" the schema at some point—e.g., when no more records following the old schema have been received for a threshold amount of time, at a specified date/time (where "old" versions of the records could be rejected), etc. This can be one way to obtain a "changeover time" when the updated schema should be enabled.

In other embodiments, the changeover time can be determined in other ways, such as by determining when it is unlikely (with some threshold amount of certainty) that additional records may be received from the old schema— e.g., determining that no records have arrived for a threshold amount of time that adhere to the old schema, generating a prediction of when no more records will be received that adhere to the old schema, etc. As another example, the data model management service 104 can determine that a changeover time has been reached (or will be reached) upon determining that some percentage of new records of a dataset adhere to an updated schema meets or exceeds a threshold. Such configurations can be especially beneficial where a fleet of nodes generates records of a dataset, and the fleet is being slowly updated to generate records according to a new schema—thus, at some point (e.g., when 50% of records in a recent window adhere to a new schema, or 75%, 90%, etc.) the schema can be changed over.

In some embodiments, the data model management service 104 may respect an "append-only schema," meaning that existing attributes/types/meaning can't be changed, though only additional attributes/columns could be added.

During a transitionary period between an old schema and a new schema, a dataset consumer may be presented with data from the "old" schema, and extra attribute values may not be presented to the user. Alternatively, the dataset consumer may be presented according to the new schema, and any missing data can be marked as such (e.g., as NULL, empty values, zeros, etc.)

Datasets may also be removed from visibility by the data model management service 104 due to confidence/fidelity issues. For example, if a validation score (and/or a health score, which may be based on the validation score as indicated above) for a dataset falls below a threshold value, the dataset may be removed from being viewed/explored by dataset consumers. The dataset administrator may be notified to correct the issues, at which time the dataset may be again made visible—either immediately, or after an amount of time has passed where the validation and/or health score remains at or above some threshold. This may also occur for "new" datasets, which may optionally be withheld from visibility until their validation/health score is at or above a threshold for some amount of time.

In some embodiments, if a dataset is relegated from the visible set to the "non-visible" set, a message may be sent to the data administrator to rectify the issues affecting the dataset. If the administrator causes the issues to be resolved, the dataset may move back into a visible set, but if no action is taken, the dataset may remain non-visible, and optionally the system may stop accepting/storing new dataset records. This can prevent an issue where at first dataset records being published are of high quality, but the quality slowly degrades and becomes problematic over time despite consumers relying on this data.

Figure 6:
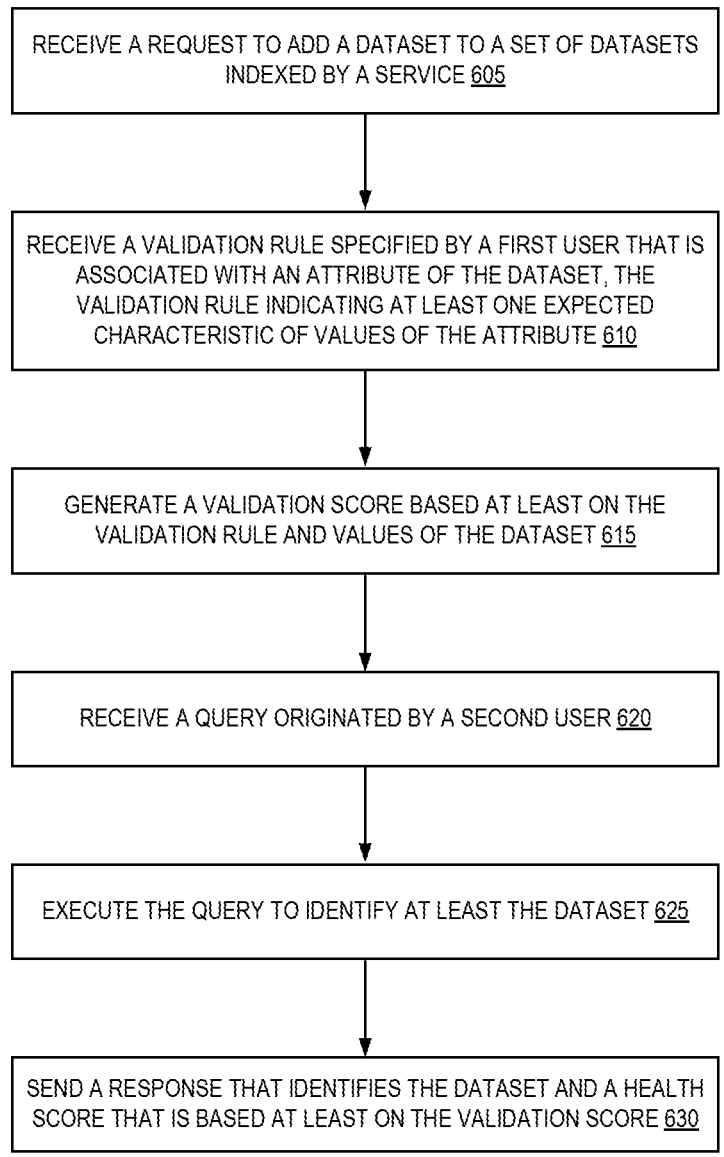
FIG. 6 is a flow diagram illustrating operations of a method for dataset schema and metadata management according to some embodiments.

FIG. 6 is a flow diagram illustrating operations of a method for dataset schema and metadata management according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by data model management service 104, management engine 118, management function(s) 122, and/ or discovery function(s) 124 of the other figures.

The operations 600 include, at block 605, receiving a request to add a dataset to a set of datasets indexed by a service. Block 605 may be performed, for example, by an interface 105 or management function 122 of FIG. 1. The request may be received at a web service endpoint of a service provider network, and may be carried by an HTTP request message. The request may include an identifier of a dataset (e.g., a namespace, a URL of a dataset, etc.), and may optionally include a schema of the dataset. The dataset may or may not already exist (that is, be persisted somewhere), and may comprise data having one or multiple attributes (or "columns").

The operations 600 include, at block 610, receiving a validation rule specified by a first user that is associated with an attribute of the dataset, the validation rule indicating at least one expected characteristic of values of the attribute. Block 610 may be performed, for example, by an interface 105 or management function 122 of FIG. 1. The validation rule may be received at a web service endpoint of a service provider network, and may be carried by an HTTP request message. The validation rule may be received in a same or different message as the request to add the dataset and may specify particular rules that must be satisfied for values of the attribute. The rule may specify one or more threshold values that the values must not be larger than, smaller than, etc. The rule may specify that values of the attribute must be within a set of defined values. The rule may specify that values of the attribute must be larger than, equal to, and/or smaller than some other value that can be derived (e.g., dynamically, or periodically) based on other data.

The operations 600 include, at block 615, generating a health score based at least on the validation rule and values of the dataset. Block 615 may be performed, for example, by the management function 122 of FIG. 1. The health score may be of a variety of types, such as a number like an integer (e.g., from 0 to 10, 0 to 100, etc.) or real/float (e.g., from 0.0 to 100.0), a boolean, a string, etc. The health score may be set to be a percentage of the health rules that have been satisfied for a last dataset record, a number of recent dataset records, all dataset records. For example, if one health rule is satisfied by all dataset records, the health score could be "100." As another example, if a first health rule is satisfied by all dataset records but a second health rule is satisfied by only 95% of dataset records, the health score could be an average of these adherence rates (e.g., =97.5, which is the average of 100 and 95), a minimum of these adherence rates (e.g., =95), etc. The health score can further be based on other factors, such as whether an amount of metadata has been provided, how long the dataset has been in conformance with the schema and/or health rules, etc.

The operations 600 include, at block 620, receiving a query originated by a second user. Block 620 may be performed, for example, by an interface 105 or discovery function 124 of FIG. 1. The query may be received at a web service endpoint of a service provider network and may be carried by an HTTP request message. The query may be an implicit query sent in a message that seeks information on all visible datasets in the system (that are visible to that user, based on access control policies 114). The query may be an explicit query specified in a message that includes one or more search terms and/or logical operators (e.g., "processor AND thread").

The operations 600 include, at block 625, executing the query to identify at least the dataset. Block 625 may be performed, for example, by discovery function 124 of FIG. 1. Executing the query may include performing a lookup in a data structure (e.g., an index, a database, etc.) identifying datasets based on text/numbers/etc. present in dataset metadata 121A provided by the administrators of the datasets.

The operations 600 include, at block 630, sending a response that identifies the dataset and a health score that is based at least on the validation score. The health score may be the validation score itself or can be based on the validation score as well as other factors—e.g., an amount of time the validation rules have been satisfied, whether records have been received on a regular/continual basis, whether the dataset has a sufficient amount of metadata that has been provided, etc. Block 630 may be performed, for example, by an interface 105 or discovery function 124 of FIG. 1. The response may be sent via a web service endpoint of a service provider network and may be carried by an HTTP response message. The response may identify one or multiple datasets and may carry one or more corresponding health scores or health score representations.

Optionally, in some embodiments, the operations 600 also include obtaining a schema of the dataset, the schema identifying a type of each of one or more attributes of the dataset, the one or more attributes including the attribute; and receiving textual metadata specified by the first user to be associated with the dataset or with at least one of the one or more attributes of the dataset. In some embodiments, obtaining the schema comprises: obtaining one or more records of the dataset; determining the type of each of the one or more attributes of the one or more records; sending a message destined to a computing device of the first user that indicates the determined type of each of the one or more attributes; and receiving a message originated by the computing device indicating whether the determined type of each of the one or more attributes is correct. In some embodiments, the query includes a search term; and the search term, a derivation of the search term, or a portion of the search term exists within the textual metadata. In some embodiments, the operations 600 also include determining that the health score does not meet or exceed a visibility threshold value; receiving a second query originated by a third user, the second query including a search term that matches one or more terms of the textual metadata associated with the dataset; executing the second query to identify one or more datasets but not the dataset despite the second query including the search term that matches one or more terms of textual metadata associated with the dataset; and sending a response that identifies the one or more datasets but not the dataset. In some embodiments, the operations 600 further include identifying the first user as being associated with the dataset; and sending a message to the first user indicating that the health score does not meet or exceed a visibility threshold value. In some embodiments, the operations 600 further include detecting one or more of a set of records of the dataset from a window of time adhere to an updated schema that includes at least one new attribute while a different one or more of the set of records of the dataset from the window of time adhere to the schema and do not include the at least one new attribute; obtaining a changeover time (e.g., sending a first message indicating a request for a changeover time and receiving a second message that identifies the changeover time; determining the changeover time based on a determination of how many records have been received in a recent period of time that adhere to the old schema, etc.); prior to the changeover time, sending the schema responsive to a first set of queries; and after the changeover time, sending the updated schema responsive to a second set of queries.

In some embodiments, at least one of the validation rules specifies at least one of: an expected type of values of the attribute; an expected maximum value of values of the attribute; or an expected minimum value of values of the attribute.

In some embodiments, the operations 600 further include receiving a policy specified by the first user to be associated with the dataset or an attribute of the dataset, the policy indicating a condition that must be satisfied to allow access to the dataset or to values of the attribute of the dataset, wherein executing the query includes determining that the condition is satisfied.

In some embodiments, the health score is further based on an amount of time the dataset is adherent to a schema of the dataset.

Figure 7:
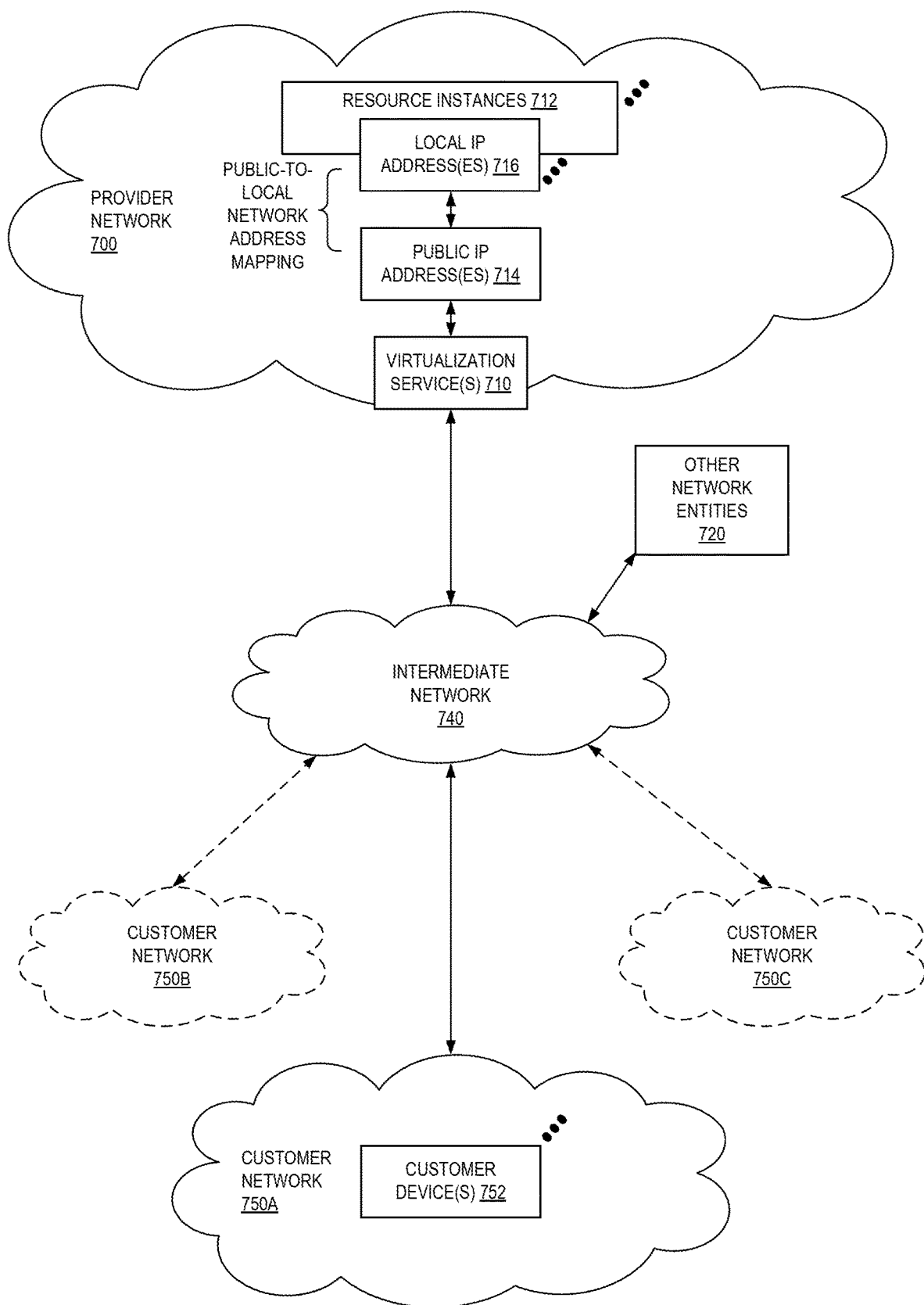
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
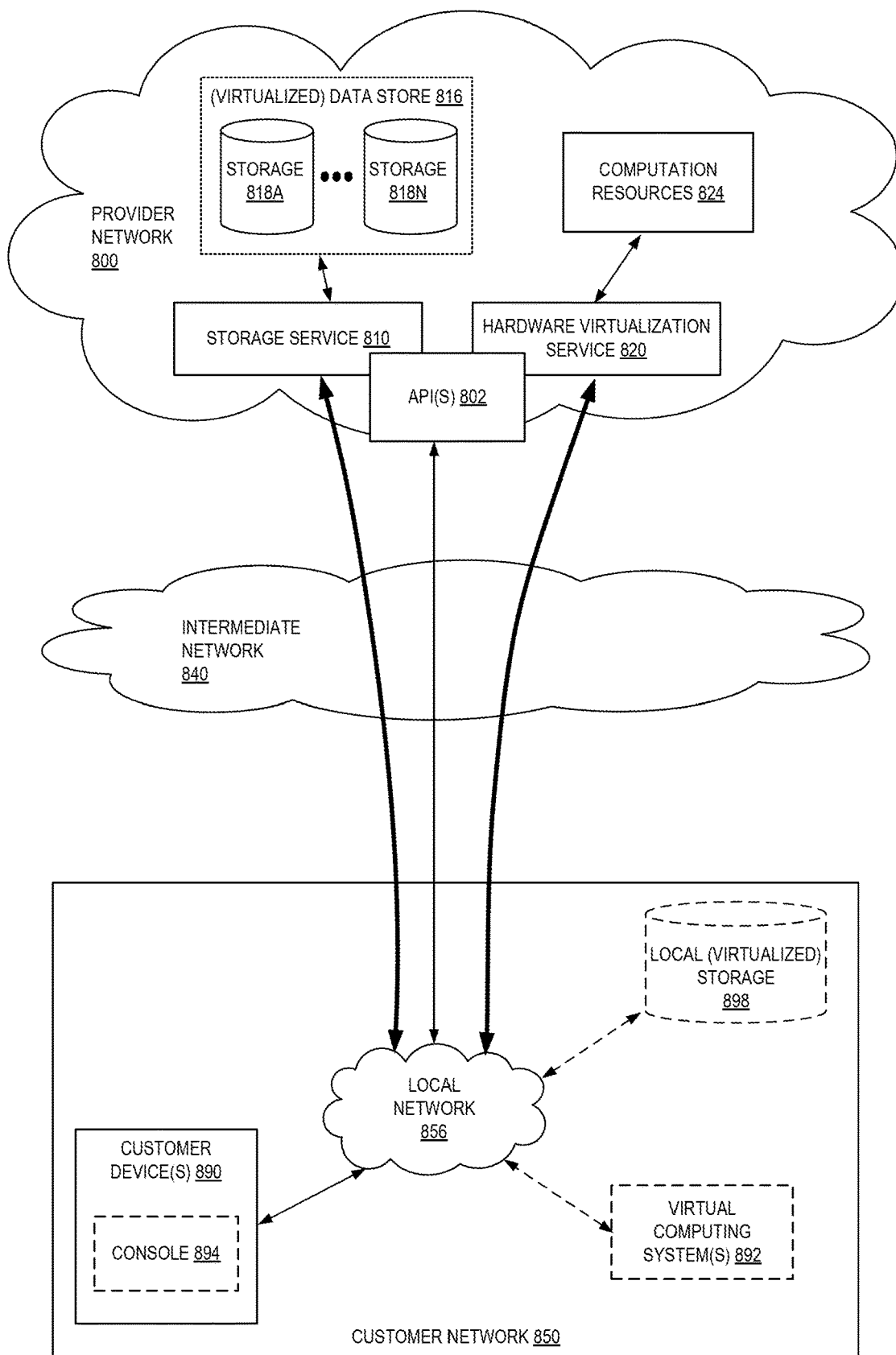
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
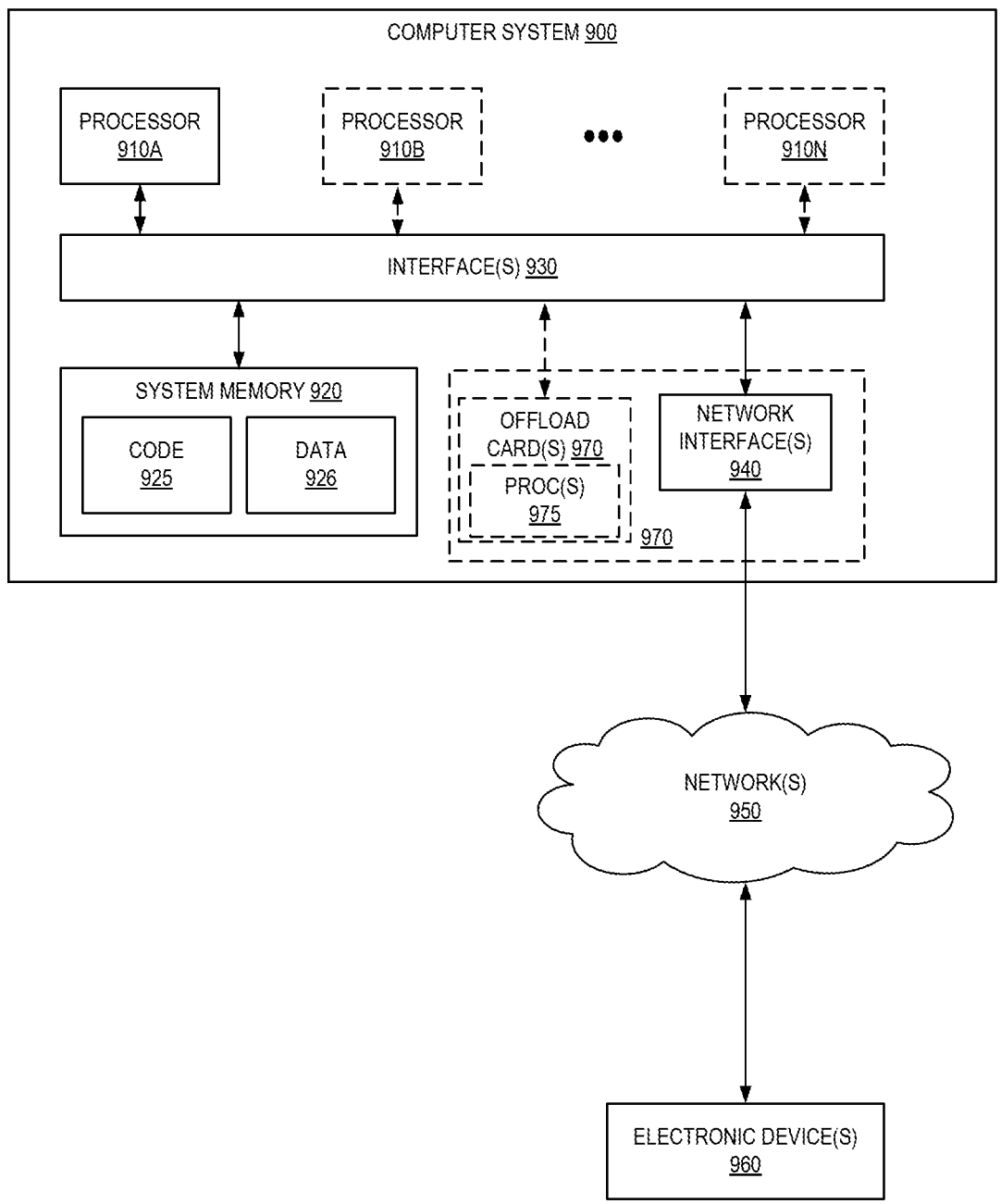
FIG. 9 is a block diagram illustrating an example computer system that may be used in some embodiments.

In some embodiments, a system that implements a portion or all of the techniques for dataset schema and metadata management as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
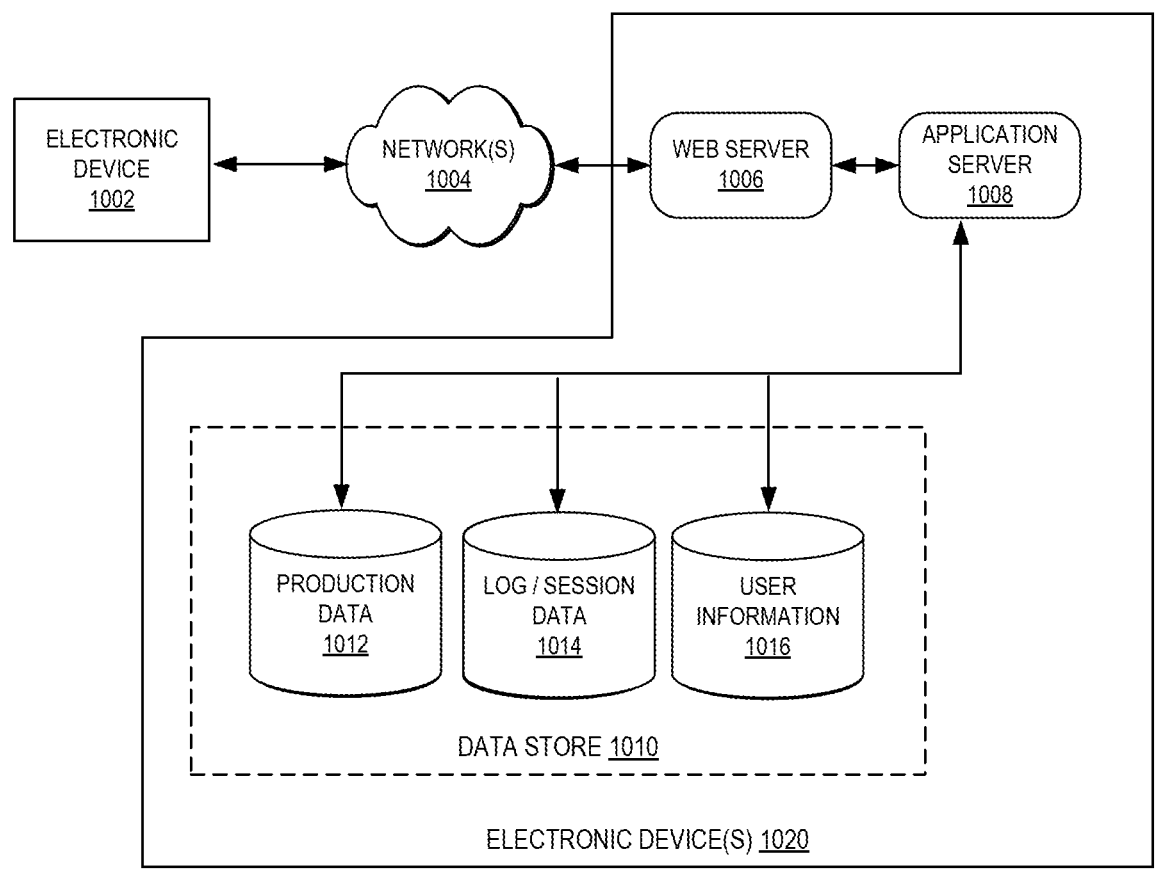
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments some or all of the messages described herein are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., datasets 108A-108M, electronic devices 132A-132N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at an endpoint of a service provider network, a request to add a dataset to a set of datasets indexed by a service of the service provider network, wherein the dataset is stored by another service of the service provider network;
obtaining a schema of the dataset, the schema identifying at least an attribute of the dataset;
receiving a validation rule specified by a first user that is associated with the attribute of the dataset, the validation rule indicating at least one expected characteristic of values of the attribute;
receiving textual metadata specified by the first user to be associated with the dataset or with the attribute of the dataset;
generating a validation score based at least on the validation rule and values of the dataset, the validation score based on a degree of adherence of the values of the dataset to the at least one expected characteristic;
receiving a query originated by a second user, the query including at least a search term;
executing the query to identify at least the dataset based on the search term at least partially matching a portion of the textual metadata;
sending a response that identifies the dataset and a health score based on the validation score;
detecting one or more of a set of records of the dataset from a window of time adhere to an updated schema that includes at least one new attribute while a different one or more of the set of records of the dataset from the window of time adhere to the schema and do not include the at least one new attribute;
obtaining a changeover time;
prior to the changeover time, sending the schema responsive to a first set of queries; and
after the changeover time, sending the updated schema responsive to a second set of queries.

2. The computer-implemented method of claim 1, wherein obtaining the schema comprises:
obtaining one or more records of the dataset;
determining a type of each of the one or more attributes of the one or more records;
sending a message destined to a computing device of the first user that indicates the determined type of each of the one or more attributes; and
receiving a message originated by the computing device indicating whether the determined type of each of the one or more attributes is correct.

3. A computer-implemented method comprising:
receiving a request to add a dataset to a set of datasets indexed by a service;
receiving a validation rule specified by a first user that is associated with an attribute of the dataset, the validation rule indicating at least one expected characteristic of values of the attribute;
obtaining a schema of the dataset, the schema identifying a type of each of one or more attributes of the dataset, the one or more attributes including the attribute;
receiving textual metadata specified by the first user to be associated with the dataset or with at least one of the one or more attributes of the dataset;
generating a validation score based at least on the validation rule and values of the dataset;
receiving a query originated by a second user;
executing the query to identify at least the dataset;
sending a response that identifies the dataset and a health score that is based on the validation score;
detecting one or more of a set of records of the dataset from a window of time adhere to an updated schema that includes at least one new attribute while a different one or more of the set of records of the dataset from the window of time adhere to the schema and do not include the at least one new attribute;
obtaining a changeover time;
prior to the changeover time, sending the schema responsive to a first set of queries; and
after the changeover time, sending the updated schema responsive to a second set of queries.

4. The computer-implemented method of claim 3, wherein obtaining the schema comprises:
obtaining one or more records of the dataset;
determining the type of each of the one or more attributes of the one or more records;
sending a message destined to a computing device of the first user that indicates the determined type of each of the one or more attributes; and
receiving a message originated by the computing device indicating whether the determined type of each of the one or more attributes is correct.

5. The computer-implemented method of claim 3, wherein:
the query includes a search term; and
the search term, a derivation of the search term, or a portion of the search term exists within the textual metadata.

6. The computer-implemented method of claim 3, further comprising:
determining that the health score does not meet or exceed a visibility threshold value;
receiving a second query originated by a third user, the second query including a search term that matches one or more terms of the textual metadata associated with the dataset;
executing the second query to identify one or more datasets but not the dataset despite the second query including the search term that matches one or more terms of textual metadata associated with the dataset; and
sending a response that identifies the one or more datasets but not the dataset.

7. The computer-implemented method of claim 6, further comprising:
identifying the first user as being associated with the dataset; and
sending a message to the first user indicating that the health score does not meet or exceed a visibility threshold value.

8. The computer-implemented method of claim 3, wherein the validation rule specifies at least one of:
an expected type of values of the attribute;
an expected maximum value of values of the attribute; or
an expected minimum value of values of the attribute.

9. The computer-implemented method of claim 3, further comprising:
receiving a policy specified by the first user to be associated with the dataset or an attribute of the dataset, the policy indicating a condition that must be satisfied to allow access to the dataset or to values of the attribute of the dataset,
wherein executing the query includes determining that the condition is satisfied.

10. The computer-implemented method of claim 3, wherein the health score is further based on an amount of time the dataset is adherent to the schema of the dataset.

11. The computer-implemented method of claim 3, wherein the request comprises one or more HyperText Transport Protocol (HTTP) request messages received at an endpoint of a service provider network.

12. A system comprising:
a data service implemented by a first one or more electronic devices, including first instructions that upon execution cause the data service to:
receive records belonging to ones of a plurality of datasets, and
store the records as part of the plurality of datasets; and
a data model management service implemented by a second one or more electronic devices, the data model management service including second instructions that upon execution cause the data model management service to:
receive a request to add a first dataset to a set of the plurality of datasets indexed by the data model management service;
receive a validation rule specified by a first user that is associated with an attribute of the first dataset, the validation rule indicating at least one expected characteristic of values of the attribute;
obtain a schema of the first dataset, the schema identifying a type of each of one or more attributes of the first dataset, the one or more attributes including the attribute;
receive textual metadata specified by the first user to be associated with the first dataset or with at least one of the one or more attributes of the first dataset;
generate a validation score based at least on the validation rule and values of the first dataset;
receive a query originated by a second user;
execute the query to identify at least the first dataset;
send a response that identifies the first dataset and the validation score;
detect one or more of a set of records of the first dataset from a window of time adhere to an updated schema that includes at least one new attribute while a different one or more of the set of records of the first dataset from the window of time adhere to the schema and do not include the at least one new attribute;
obtain a changeover time;
prior to the changeover time, send the schema responsive to a first set of queries; and
after the changeover time, send the updated schema responsive to a second set of queries.

13. The system of claim 12, wherein to obtain the schema, the second instructions cause the data model management service to:
obtain one or more records of the first dataset;
determine the type of each of the one or more attributes of the one or more records;
send a message destined to a computing device of the first user that indicates the determined type of each of the one or more attributes; and
receive a message originated by the computing device indicating whether the determined types of the one or more attributes is correct.

14. The system of claim 12, wherein the second instructions upon execution further cause the data model management service to:
determine that the validation score does not meet or exceed a visibility threshold value;
receive a second query originated by a third user, the second query including a search term that matches one or more terms of the textual metadata associated with the first dataset;
execute the second query to identify one or more datasets but not the first dataset despite the second query including the search term that matches one or more terms of textual metadata associated with the first dataset; and
send a response that identifies the one or more datasets but not the first dataset.

15. The system of claim 12, wherein at least one of the validation rule specifies at least one of:
an expected type of values of the attribute;
an expected maximum value of values of the attribute; or
an expected minimum value of values of the attribute.

16. The system of claim 12, wherein the response further indicates a health score based at least in part on an amount of time the dataset is adherent to the schema of the dataset.

17. The system of claim 12, wherein:
the query includes a search term; and
the search term, a derivation of the search term, or a portion of the search term exists within the textual metadata.

18. The system of claim 12, wherein the request comprises one or more HyperText Transport Protocol (HTTP) request messages received at an endpoint of a service provider network.

19. The system of claim 18, wherein:
the service provider network is a distributed provider network implemented in multiple geographic regions;
the data service comprises an object storage service of the service provider network; and
the data model management service is also a part of the service provider network.

20. The system of claim 12, wherein to obtain the changeover time, the data model management service is to:
determine that no records adhering to the schema are received for a threshold amount of time;
determine that an amount of records received over an amount of time that adhere to the updated schema meets or exceeds a threshold; or
generate a prediction as to when no more records would be received that adhere to the schema, wherein the changeover time is or is based on the prediction.

* * * * *